Dec. 16, 1952     C. GRANTHAM     2,621,949
RESILIENT BUSH
Filed March 3, 1948     3 Sheets-Sheet 1
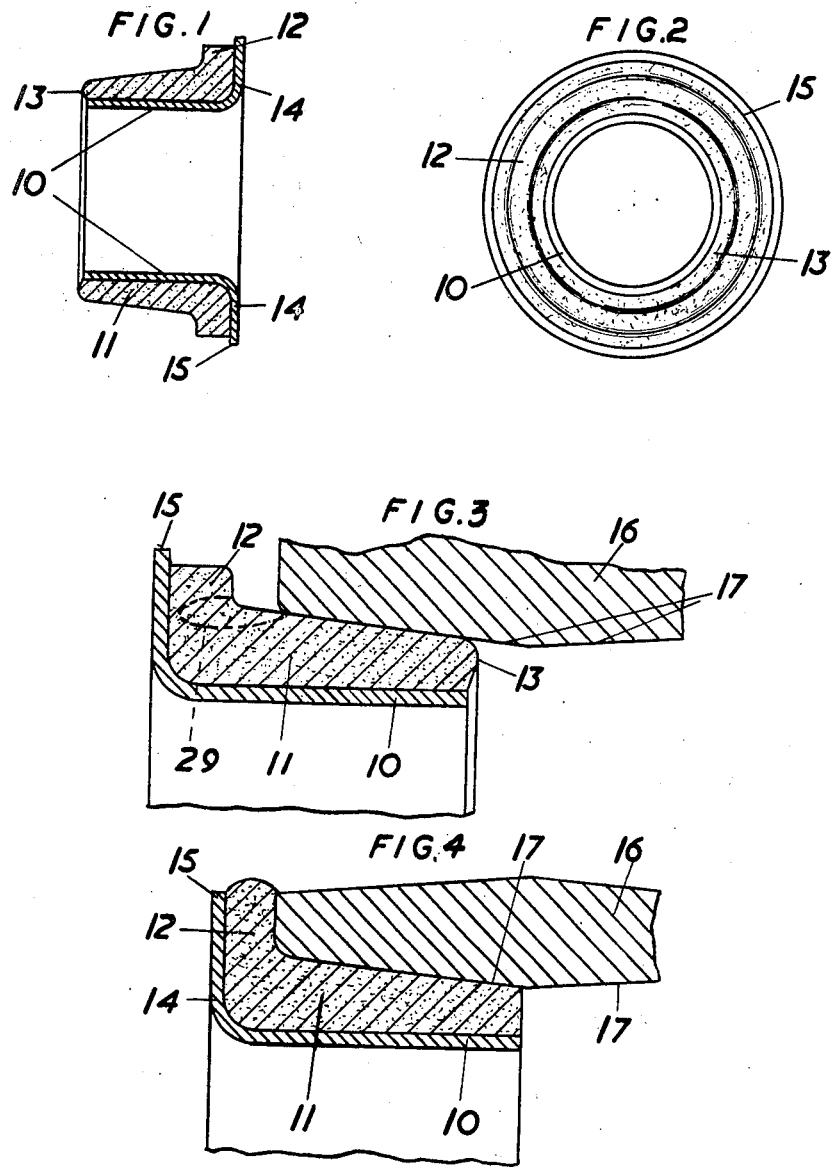
INVENTOR
Cyril Grantham.
BY
Harness, Dickey & Pierce.
ATTORNEYS.

Dec. 16, 1952        C. GRANTHAM        2,621,949
RESILIENT BUSH
Filed March 3, 1948        3 Sheets-Sheet 2
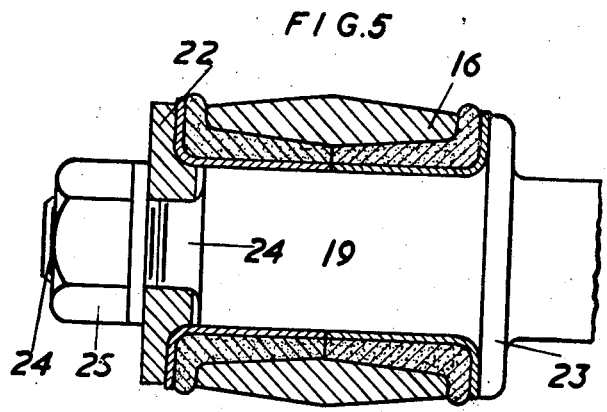
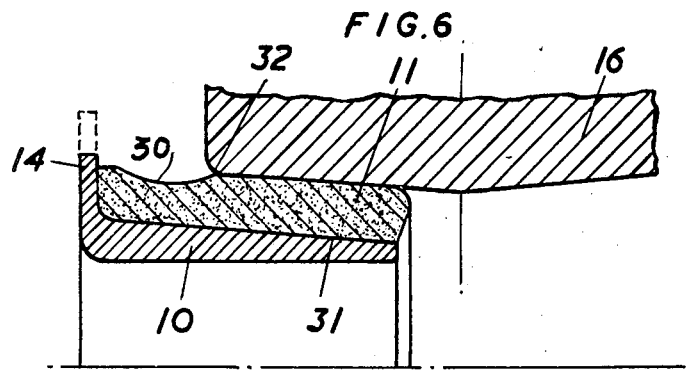
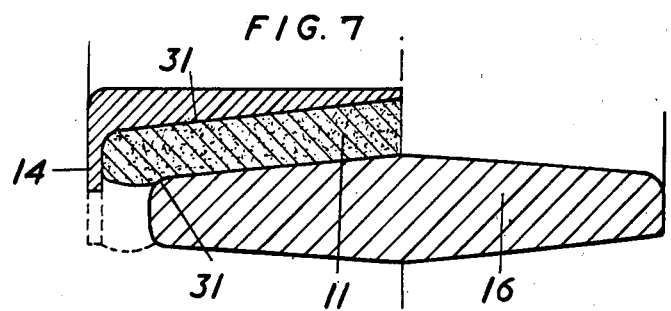
INVENTOR.
Cyril Grantham.
BY
Harness, Dickey & Pierce.
ATTORNEYS.

Dec. 16, 1952    C. GRANTHAM    2,621,949
RESILIENT BUSH
Filed March 3, 1948    3 Sheets-Sheet 3
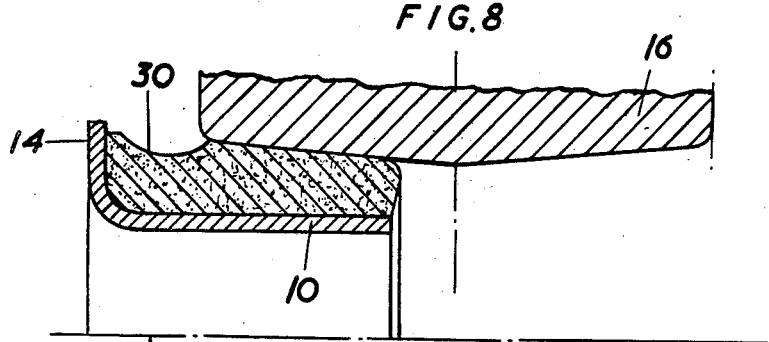
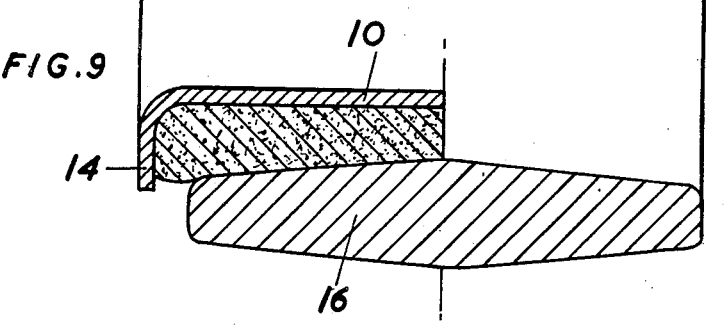
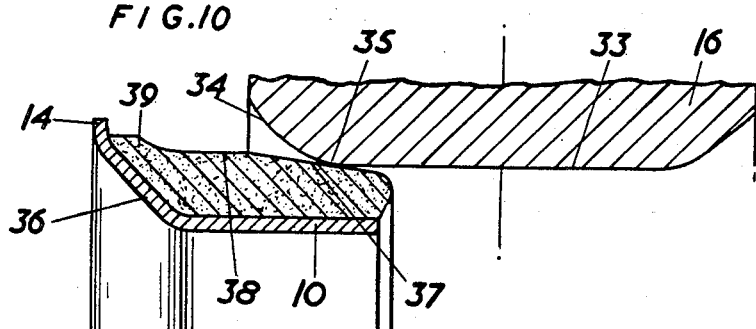
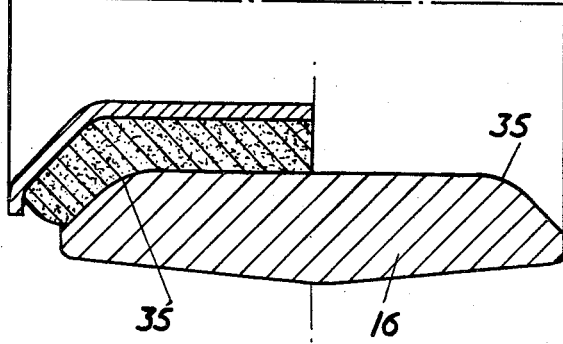
INVENTOR
Cyril Grantham.
BY
Harness, Dickey & Pierce
ATTORNEYS.

Patented Dec. 16, 1952

2,621,949

UNITED STATES PATENT OFFICE 2,621,949

RESILIENT BUSH

Cyril Grantham, Leicester, England, assignor to Metalaslik Limited, Leicester, England, a British company Application March 3, 1948, Serial No. 12,808
In Great Britain March 15, 1947

6 Claims. (Cl. 287—85)

1

The invention relates to resilient bushes of the kind comprising a sleeve of flexible material such as rubber with an ablutment means at one end. Cylindrical bushes have been employed, for example, in bearings provided with means whereby end pressure can be applied to the flexible material to enable the bush to be forced tightly into place in the bore of a part of the bearing. In the bearing eye of a vehicle spring such a bush may be used, or there may be two bushes inserted into the eye of the spring from each end, to enable the spring to be hinged by a suspension link, or shackle, to a vehicle chassis member, the resilient material accommodating angular movements between the parts of the bearing and being loaded thereby in torsion while relative movements in other directions are resisted mainly in compression. In such a use the bush or bushes will surround a bolt which passes through the side members of the suspension link and through the bush, or bushes, in the spring eye and by means of this bolt end pressure can be applied to the flexible material. A known abutment means in this connection, is to employ radial projections at one end of the rubber bush which projections are disposed between the end face of the bearing eye and the face of the side member. End pressure on the bearing subjects the aforesaid projections to pressure.

An object of the invention is to provide a resilient bush comprising a sleeve of flexible material with a radial flange at one end secured around a metal inner sleeve, the outer contour of the flexible sleeve being tapered from the flanged or thickened end to the other end so that its outer surface, excluding the flange, is that of a truncated cone and said tapered contour being free throughout its length until it is inserted in the bearing.

Another object of the invention is a resilient bush comprising in combination a flanged outer sleeve of flexible material having a tapered outer surface, a metal inner sleeve around which the flexible material of the outer sleeve is secured, the inner metal sleeve providing a flange at one end to which the flange of the outer sleeve is secured and said metal sleeve being shorter than the outer flexible sleeve and the smaller end of the said outer sleeve being arranged to overhang, at its circumference, the adjacent end of the metal sleeve whereby the effect of frictional drag on the outer sleeve when the bush is submitted to end pressure is compensated.

A still further object is to provide a resilient bush of mainly truncated conoidal external form

2 and provided with a radial abutment means at one end the resilient material of which is secured around a cylindrical metal inner sleeve that is provided with a radially directed flange at one end to which the radial abutment means of the bush is secured.

Another object is to provide constructions of the resilient bush in which means are provided to relieve stress concentration in the flexible material and to prevent excessive concentration at a particular part of the surface thereof.

When resilient bushes in accordance with the invention are employed in a bearing, the eye of the bearing which receives the bush is formed internally in known manner with a taper surface of the same sense as the external taper of the bush; and when two bushes are employed, as in a spring eye suspension arrangement, the said eye is oppositely tapered from its ends towards the centre and receives two bushes inserted one from each end.

In the appended drawings:

Figure 1 is a longitudinal sectional view of a resilient bush in accordance with the invention in unloaded condition.

Figure 2 is an end view of the bush seen in Figure 1.

Figure 3 is a fragmentary sectional view of the bush seen in Figures 1 and 2 in relation to a bearing eye in "free" position.

Figure 4 is a similar view to Figure 3 showing the bush and bearing assembled and the flexible material of the bush under a degree of preloading.

Figure 5 is a sectional view of a spring eye suspension bearing with the invention applied.

Figure 6 illustrates a modified construction of the improved bush.

Figure 7 shows the bush forced home in a bearing.

Figures 8 and 9 are similar views of a further constructional form.

Figures 10 and 11 are similar views of the improved bush adapted for use in a bearing with a bore that is parallel except for the end portions.

The resilient bush illustrated in Figures 1 and 3 and shown in application to one type of flexible hinge bearing in Figure 5, comprises a metal inner sleeve 10 of cylindrical form and an outer sleeve 11 of rubber having a flange 12 at one end and an outer surface which tapers from the flange 12 to the other end of the sleeve, where the end portion of the sleeve projects as at 13, at its circumference, beyond the end of the metal inner sleeve 10. A radial flange 14 is formed at one end of the metal inner sleeve 10 to conform with and receive the radial flange 12 of the outer rubber sleeve. This radial flange 14 is preferably slightly larger in diameter than the flange 12 of the rubber outer sleeve 11 as shown at 15.

The flanged metal inner sleeve 10 to which the flexible rubber outer sleeve 11 is secured enables the flexible material of the bush to be forced more readily into the bore of a receiving part, while the tapered form of the flexible sleeve enhances the pre-loading that may be imparted to the bush by axial pressure.

The preferred construction of the end 13 of the flexible outer sleeve 11 remote from the flange 12 offers an undercut or concave end face and the resulting overhang of the flexible material compensates for the volumetric effect of the frictional drag on the outer surface of the flexible sleeve during axial assembly of the bush in the bore of a receiving part thereby ensuring that the said flexible material is flush with the metal inner sleeve 10 and that the abutting ends of two oppositely inserted bushes meet without spaces between the end faces of the flexible sleeves.

In Figure 3 a resilient bush as illustrated in Figures 1 and 2 is in process of insertion into a bearing eye or ring 16, and it will be seen that the tapered external surface of the bush is being received in one end of a bore which is oppositely tapered from the ends towards the central portion, as at 17. From the instant of engagement of the tapered exterior of the rubber outer sleeve 11 of the bush with the tapered bore 17, frictional drag on the said surface will be experienced as the bush is forced into place in the bearing part 16 by axial pressure, but the overhang at 13 compensates for this, as mentioned above, in the manner shown by Figure 4 where the bush is in the assembled position. It will also be seen from this figure compared with Figure 3 that the extended metal flange at 15 provides support as the rubber flange 12 is forced to expand radially outwards by end pressure. The metal inner sleeve 10 facilitates the movement of the bush into place over the central member 19 (Figure 5) of the bearing assembly since it prevents frictional drag occurring at the inner surface of the rubber as well as at the outer.

In Figure 5 a vehicle spring eye 16 is shown connected to parts 22 and 23 of a suspension link member and instead of a separate axial bolt, an inner member 19 of the bearing is formed integral with the link member 23 and has a turned down end 24 on which a screw threaded part is provided to receive a clamping nut 25. The bushes illustrated in this figure are of the kind shown in Figure 1.

It may be desirable to provide the flexible sleeve 11 with an annular relieving recess or with an annular series of small recesses in order to avoid stress concentration at such points around the sleeve as the junction between the cone and the flange or abutment 12. An example of such an annular recess is indicated by the dotted lines 29 in Figure 3.

In Figure 6 the rubber sleeve 11 is provided with a shallow annular recess 30 moulded into the surface with the object of avoiding stress concentration under load and also preventing excessive bulging between the metal flange 14 and the bearing when the sleeve is forced into the bearing member 16 as shown in Figure 7. As will be seen, the metal inner sleeve 10 of the improved bush in this example has its outer surface 31 tapered in the same sense as the taper on the exterior of the rubber sleeve and in the interior of the bearing. The flange 14 of the metal inner sleeve may be large as in the examples in Figures 1, 2, 3 and 4, or may be reduced to coincide approximately with the large diameter of the tapered hole in the bearing. If a large flange 14 is used in combination with the tapered outer surface of the metal inner sleeve the resistance of the bush to axial loading is increased, but if a smaller flange 14, as shown in Figures 6 and 7, is used with the tapered surface of the metal sleeve then the resistance to axial loading is maintained, while the arrangement assists the recessed surface at 30 in relieving concentration of stress in the rubber at the point 32.

In Figures 8 and 9 the relieving recess 30 and the smaller flange 14 are shown applied to a bush having a parallel metal inner sleeve 10. The overall length of the sleeve is slightly reduced so that the metal flange 14 to which the rubber is bonded, as it is to the sleeve 10, is closer to the end of the bearing. The flange 14, while smaller than in Figure 1, is larger than the bore of the bearing member 16.

It is preferred in all examples described above that the bore of the receiving part of the bearing should be oppositely tapered from the ends towards the central portion.

In Figures 10 and 11 is shown a modification in the internal bore of the bearing 16 and of the metal inner sleeve 10 of the bush. The bearing has a bore which is parallel as at 33 for the greater part of the length and at each end terminates in a pronounced chamfer 34. The chamfer 34 is preferably tangent to the parallel bore as at 35. The metal inner sleeve 10 of the bush is complementarily shaped, i. e. it has a parallel leading portion and a flange 14 which is mainly conical, as at 36, of an inclination corresponding to the chamfer 34 of the bearing, or it may be less steep. The flange terminates in a short radial section. The shape of the rubber outer sleeve of the bush in free position is seen in Figure 10: its conical external shape is preserved for some distance from its leading end as at 37 and is followed by a part of constant diameter 38 connected by an outwardly curved portion to a small enlargement at 39.

The assembled position of the bush, Figure 11, gives sufficient preloading of the rubber and the resistance to axial loading is given by the rubber being pressed against the chamfered surfaces by the conical part 36 of the metal flange of the bush. The rubber outer sleeve overhangs the end of the metal inner sleeve as at 13 in Figures 1, 2 and 3.

Rubber, or a synthetic rubber is the most suitable flexible material for the outer sleeve 11 of the bush and is preferably surface bonded to the metal inner sleeve 10 and to the flange thereof 14, when the latter is provided.

The improved resilient bush with its outer sleeve provided with a tapered surface and a metal inner sleeve will sustain satisfactorily a greater axial load than a plain rubber bush since the resilient flange will be restrained from undue radial displacement and distortion by the metal flange 10 or a washer such as 26, 27 or 28, and therefore will take axial compression and augment the pre-loading for which the bush with its tapered external surface is especially adapted. The conical surface of the flexible element of the bush ensures an effective grip in the bore of the receiving part and thus avoids any tendency to slip or relative movement under considerable torsional or axial load.

Under conditions which impose axial loading on a bearing assembly incorporating twin bushes as above described and illustrated there is no likelihood of that bush which is remote from the application of the load leaving the inner surface of the receiving part.

The metal sleeve serves to locate the bush and to prevent excessive pressure being applied to the flange of the flexible element.

An example of a suitable taper for the improved resilient bush may be given as one in which the outer line of an axial section of the bush makes an angle of five degrees to the axis of the bush.

In any example of the bush where the metal inner sleeve has a flange, the flange may, if desired, be provided with prolonged peripheral tags at spaced intervals which can be clinched over the link members or equivalent parts 22, 23, of the flexible bearing, as shown in dotted lines at 40, Figure 5, in order to prevent relative movement between the metal inner sleeve of the bush and the said parts.

I claim:

1. Resilient bush assembly in a flexible bearing comprising a bearing eye including oppositely tapering end portions in its bore, a pair of pivotal parts resiliently connected to said eye, a metal axial member passing through said pivotal parts and said eye retaining them in the assembled relation; a pair of resilient bushes inserted around said axial member and within the end portions of the bore of the bearing eye, each of said bushes comprising an outer sleeve of rubber and an inner sleeve of metal; a flange on each metal inner sleeve and the rubber sleeve of each bush being secured by bonding to the metal inner sleeve thereof and to the flange of said sleeve, the external surface of each rubber outer sleeve including a taper portion, and between said tapered portion and the part secured to the metal flange a recessed portion, and said metal inner sleeve of each bush having a tapered surface to which the rubber sleeve is secured by bonding.

2. Resilient bush assembly in a flexible bearing comprising a bearing eye including oppositely tapering end portions in its bore, a pair of pivotal parts resiliently connected to said eye, a metal axial member passing through said pivotal parts and said eye retaining them in the assembled relation; a pair of resilient bushes inserted around said axial member and within the end portions of the bore of the bearing eye, each of said bushes comprising an outer sleeve of rubber and an inner sleeve of metal; a flange on each metal inner sleeve and the rubber sleeve of each bush being secured by bonding to the metal inner sleeve thereof and to the flange of said sleeve, the external surface of each rubber outer sleeve including a taper portion, and between said tapered portion and the part secured to the metal flange a recessed portion, and the said flange of the said metal sleeve including a portion of conical form as well as a substantially radial portion, the radial portion being larger in diameter than the rubber sleeve in the unloaded condition of the bush.

3. Resilient bush for pivotal bearings, said bush comprising a metal inner sleeve and a resilient sleeve of material such as rubber and which is bonded throughout the length of its bore around said metal inner sleeve and has a radial flange at one end, said metal inner sleeve having a radial flange at one end which extends along the end face of said radial flange of said resilient sleeve, the outer contour of said resilient sleeve being free throughout its length until it is inserted in a bearing, and one end face overhanging the metal inner sleeve; the said outer contour being tapered towards the said overhanging end for at least the greater part of its length, whereby when said resilient sleeve and its metal inner sleeve are forced by end pressure into a bearing said resilient sleeve is preloaded by axial pressure and the overhanging end face compensates for the volumetric effect of the frictional drag against the inner surface of the bearing.

4. Resilient bush for pivotal bearings as defined in claim 3 wherein the outer surface of the resilient sleeve includes a substantial portion which is tapered so that the thickness of said sleeve at one end is greater than at the other, and said resilient sleeve is recessed adjacent the junction of the tapered outer contour of said resilient sleeve and said radial flange of said resilient sleeve for relieving stress concentration therein when the resilient sleeve is under axial pressure and submitted to the normal loads for which the bearing is designated.

5. Resilient bush for pivotal bearings, said bush comprising a metal inner sleeve and a resilient sleeve of material such as rubber and which is bonded throughout the length of its bore around said metal inner sleeve, the outer contour being free throughout its length until it is inserted in a bearing, and one end face overhanging the metal inner sleeve; the said outer contour being tapered towards the said overhanging end for at least the greater part of its length, whereby when said resilient sleeve and its metal inner sleeve are forced by end pressure into a bearing said resilient sleeve is preloaded by axial pressure and the overhanging end face compensates for the volumetric effect of the frictional drag against the inner surface of the bearing, said resilient sleeve having a radial flange at one end and the metal inner sleeve having a radially directed flange at one end which receives the end face of the said radial flange of the sleeve, said face being bonded to the radially directed flange of the metal inner sleeve and said radially directed metal flange in the unloaded condition of the resilient sleeve being larger in diameter than the radial flange of the resilient sleeve so as to support said radial flange when enlarged under axial pressure.

6. Resilient bush for pivotal bearings, said bush comprising a metal inner sleeve and a resilient sleeve of material such as rubber and which is bonded throughout the length of its bore around said metal inner sleeve, the outer contour being free throughout its length until it is inserted in a bearing, and one end face overhanging the metal inner sleeve; the said outer contour being tapered towards the said overhanging end for at least the greater part of its length, whereby when said resilient sleeve and its metal inner sleeve are forced by end pressure into a bearing said resilient sleeve is preloaded by axial pressure and the overhanging end face compensates for the volumetric effect of the frictional drag against the inner surface of the bearing, said resilient sleeve having a radial flange at one end and the metal inner sleeve having a radially directed flange at one end which receives the end face of the said radial flange of the sleeve, said face being bonded to the radially directed flange of the metal inner sleeve and said radially directed metal flange in the unloaded condition of the resilient sleeve being larger in diameter than the radial flange of the resilient sleeve so as to support said radial flange when enlarged under axial pressure, said resilient sleeve being recessed adjacent the junction of said resilient sleeve and said radial flange of said metal inner sleeve for relieving stress concentration within said resilient sleeve.

CYRIL GRANTHAM.

REFERENCES CITED

The following references are of record in the file of this patent:

UNITED STATES PATENTS

| Number | Name | Date |
| --- | --- | --- |
| 1,862,484 | Lord et al. | June 7, 1932 |
| 1,931,945 | Zerk | Oct. 24, 1933 |
| 2,030,750 | Leighton | Feb. 11, 1936 |
| 2,308,967 | Kuss | Jan. 19, 1943 |
| 2,346,574 | Guy | Apr. 11, 1944 |
| 2,414,743 | Kaemmerling | Jan. 21, 1947 |

FOREIGN PATENTS

| Number | Country | Date |
| --- | --- | --- |
| 2684/26 | Australia | Oct. 8, 1926 |